United States Patent [19]
Clapham et al.

[11] Patent Number: 5,392,870
[45] Date of Patent: Feb. 28, 1995

[54] MINERAL CUTTER TOOLING SYSTEM

[75] Inventors: William S. Clapham; Alan Wood, both of Ecclesfield, England

[73] Assignee: Hydra Tools International PLC, Sheffield, England

[21] Appl. No.: 156,887

[22] Filed: Nov. 23, 1993

[30] Foreign Application Priority Data

Dec. 4, 1992 [GB] United Kingdom ............... 9225408

[51] Int. Cl.$^6$ .................. E21B 10/00; F16L 39/00; F16B 7/10
[52] U.S. Cl. ................... 175/427; 299/92; 37/458; 285/321; 403/166
[58] Field of Search ............ 175/424, 427; 299/79, 299/81, 91-94; 37/455, 458; 403/165, 166; 285/304, 321

[56] References Cited

U.S. PATENT DOCUMENTS

| | | | |
|---|---|---|---|
| 3,434,745 | 3/1969 | Jackman | 285/321 X |
| 4,201,421 | 5/1980 | Den Besten et al. | 299/92 X |
| 4,333,687 | 6/1982 | Barnstorf | 299/81 |
| 4,484,783 | 11/1984 | Emmerich | 299/92 X |
| 4,678,238 | 7/1987 | Emmerich | 299/81 |
| 4,728,153 | 3/1988 | Ojanen et al. | 299/92 |
| 4,911,504 | 3/1990 | Stiffler et al. | 299/91 |
| 4,944,560 | 7/1990 | Osterwise | 299/91 |
| 5,172,500 | 12/1992 | Renski et al. | 37/458 X |
| 5,303,984 | 4/1994 | Ojanen | 299/92 XC |

FOREIGN PATENT DOCUMENTS 2166178A 4/1986 United Kingdom .

*Primary Examiner*—Ramon S. Britts
*Assistant Examiner*—Roger J. Schoeppel
*Attorney, Agent, or Firm*—Trexler, Bushnell, Giangiorgi & Blackstone, Ltd.

[57] ABSTRACT

The invention provides a liner sleeve (8) adapted, in use, to be interposed between the external periphery of a round shank (3) of a point attack, mineral cutter pick (1), and the internal periphery of a circular, shank-receiving bore (5) of a pick box (6), the sleeve (8) being constituted by a plurality of individual rings (14A, 14B, 14C) stacked end-to-end in abutting relationship about a common longitudinal axis (15), the rings (14A, 14B, 14C) together having an axial length (17) approximating to the axial length (12) of the bore (5). The invention also includes a pick box (6) provided with such a sleeve (8), and also a combination of pick (1) and pick box (6)

10 Claims, 3 Drawing Sheets

MINERAL CUTTER TOOLING SYSTEM

This invention relates to various aspects of a mineral cutter tooling system of the point attack, round shank type.

Point attack picks are intended in service to rotate so that wear on the conventionally provided carbide tip is not localised but is even, thus maximising the pick life. In one known pick and box construction a liner sleeve is interposed between the pick shank and the circular shank-receiving bore of the box, so that damage by wear or fretting, due to pick movement in service, is imparted to the sleeve rather than the box, (so that the box remains undamaged and hence the rotary cutting drum to which the box is welded need not be taken out of service for the welding-on of a fresh box) and consequently extraction of a damaged sleeve can be effected on site e.g. at a coal face. However, extraction is relatively difficult in mine conditions, as a typical drum is provided with 40–80 picks as, for a shrink fit sleeve, access must be provided for a tool to draw the sleeve from the outer end of the bore, and for a loose fit sleeve, at least one circlip must be removed to permit withdrawal of the sleeve from the outer end of the bore.

A basic object of the present invention is to retain the advantages of the liner sleeve principle in a point attack round shank tooling system, yet provide a much simplified sleeve replacement arrangement for prevailing mine conditions.

According to a first aspect of the present invention there is provided a liner sleeve adapted, in use, to be interposed between the external periphery of a point attack, round shank of a mineral cutter pick, and the internal periphery of a circular shank-receiving bore of a pick box, the sleeve being constituted by a plurality of individual rings stacked end-to-end in abutting relationship about a common longitudinal axis, the rings together having an axial length approximating to the axial length of the bore.

Preferably, the rings-are split spring steel rings e.g. split by a straight slot, an arrow slot or a diagonal slot.

According to a second aspect of the present invention there is provided a pick box having a circular section bore to receive a shank, also a circular section, of a mineral cutter pick, the bore having open upper and lower ends and being lined with a sleeve constituted by a plurality of individual rings stacked end-to-end in abutting relationship about a common longitudinal axis and adapted to engage the bore frictionally so as to be self-retaining therein, and of such internal diameter to engage the shank of the pick as a push-in, prise-out, sliding fit.

Preferably, the rings are positionally self-retaining within the bore. Preferably the rings are friction fit within the bore.

Preferably, the upper end of the bore has a frustoconical mouth to aid insertion of a ring within the bore in a direction from the upper end towards the lower end.

According to a third aspect of the present invention, there is provided a point attack round shank pick in combination with a box, the latter having a circular section, shank-receiving bore having an upper end adjacent the head of the pick and a lower end, with a sleeve interposed between the bore and the shank, the sleeve being constituted by a plurality of individual rings stacked end-to-end in abutting relationship on a common axis co-incident with that of the bore, and with sufficient clearance provided adjacent the lower end of the bore that the lower ring may exit from the lower end of the bore when a fresh ring is hammered into the upper end of the bore.

Preferably, three rings are provided—being an upper ring abutting a middle ring abutting a lower ring—approximating in total length to the axial length of the bore. As maximum fretting (wear) occurs towards the extreme ends of the bore, the lower, damaged ring may simply be removed by hammering a fourth, replacement ring into the upper end of the bore, so that the bore-again houses three rings.

Thus, the unworn middle ring now becomes the lower ring, the worn, upper-ring becomes the middle ring (but this is of no consequence as little or no fretting occurs at the middle ring), and the fourth ring is now the new upper ring. At the next occasion that fretting at the upper and lower rings has occurred to such an extent that replacement is required, all three rings (which are then all in a worn condition) must be knocked out, exiting from the lower end of the bore, and replaced with three fresh rings hammered one after the other into the upper end of the bore, and this process of replacing first one ring and then three rings is repeated as and when necessary.

Thus, in contrast to the prior art, the tooling system of the invention avoids the need to extract prior art, one piece sleeves from the upper end of the bore, necessitating either a drawing tool or circlip pliers, but on the contrary enables the multiple rings making up the sleeve to be extracted one at a time from the lower end of the bore by the simple technique of hammering one or more replacement sleeves into the upper end of the bore.

As indicated previously, the pick has, conventionally, a carbide tip and also an enlarged head which provides, on its underside, an annular seating shoulder to seat on an annular abutment surface of the box. In accordance with a preferred feature, the box is also provided with an anvil spaced from the lower end of the bore on which anvil a lower end of the shank is adapted to seat, to provide an additional seating surface. Thus, the clearance for exit of hammered out rings is defined between the lower end of the bore and the seating surface of the anvil. In detail, this clearance may typically have a dimension, in the axial direction of the bore, of 25 mm, while each spring ring may have an axial dimension, or length, of 20 mm. Hence, the bore approximates to 60 mm in length.

It is also preferred for the box to be provided with a spray-receiving aperture to receive a spray nozzle, which is preferably of a rear-entry kind to direct a spray of water towards the tip, preferably towards the rear of the tip into the so-called incendive sparking zone.

The various aspects of tooling system in accordance with the invention will now be described in greater detail, by way of example, with reference to the accompanying drawings, in which.

Figure 4:
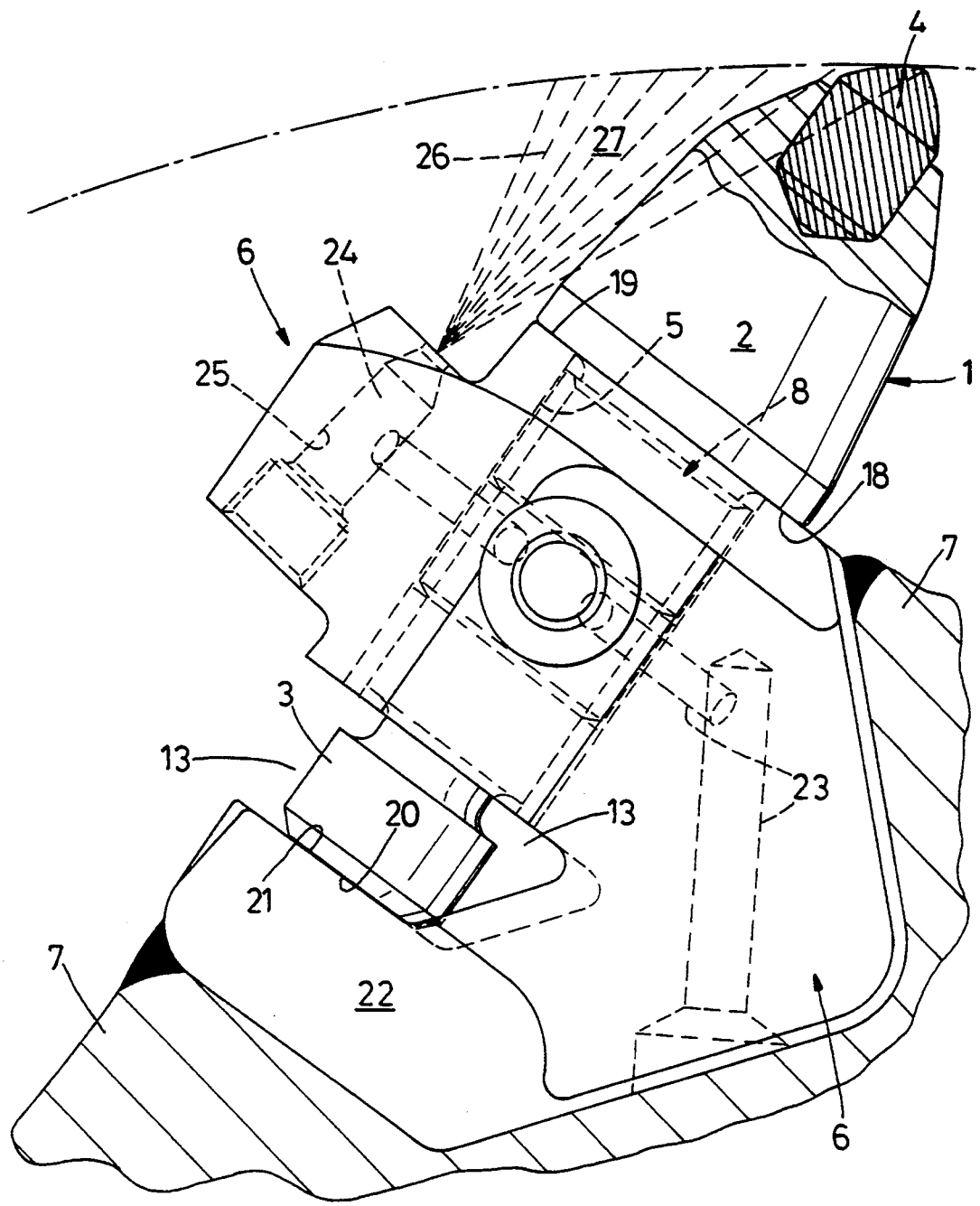
FIG. 4 is a view of a pick, pick box and sleeve combination, in accordance with the third aspect.

In FIG. 4 of the drawings, is shown a mineral cutter pick 1, of the point attack type, comprises an enlarged head 2 and integral shank 3 of circular section, the head 2 being provided with a tungsten carbide insert 4.

The shank 3 is adapted to be received in a circular section bore 5 of a pick box 6 welded to a rotary cutting drum 7 of a mineral mining machine (not shown) with an interposed sleeve 8. The bore 5 has an upper end 9 provided with a frusto-conical mouth 10, a lower end 11, and an axial length 12, with a clearance 13 beyond the lower end 11.

The sleeve 8, in accordance with the first aspect of the invention, comprises three spring steel split rings 14A, 14B and 14C stacked end-to-end about a common longitudinal axis 15, which axis 15 is also common to the bore 5 and the shank 3. The rings 14A, 14B and 14C, and hence the sleeve 8, has an internal diameter 16 and an axial length 17.

Figure 1:
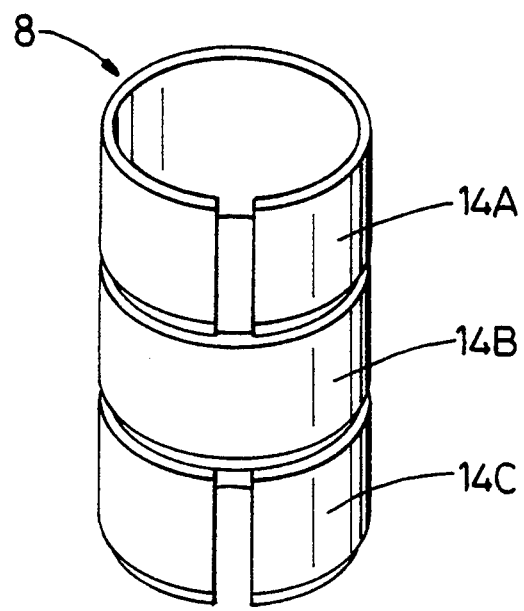
FIG. 1 is a perspective view of a sleeve in accordance with the first aspect.
Figure 2:
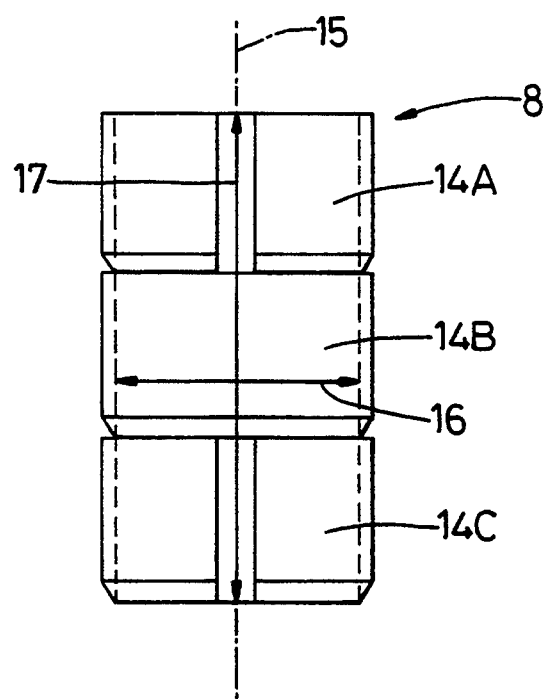
FIG. 2 is a side elevation of the sleeve of FIG. 1.
Figure 3:
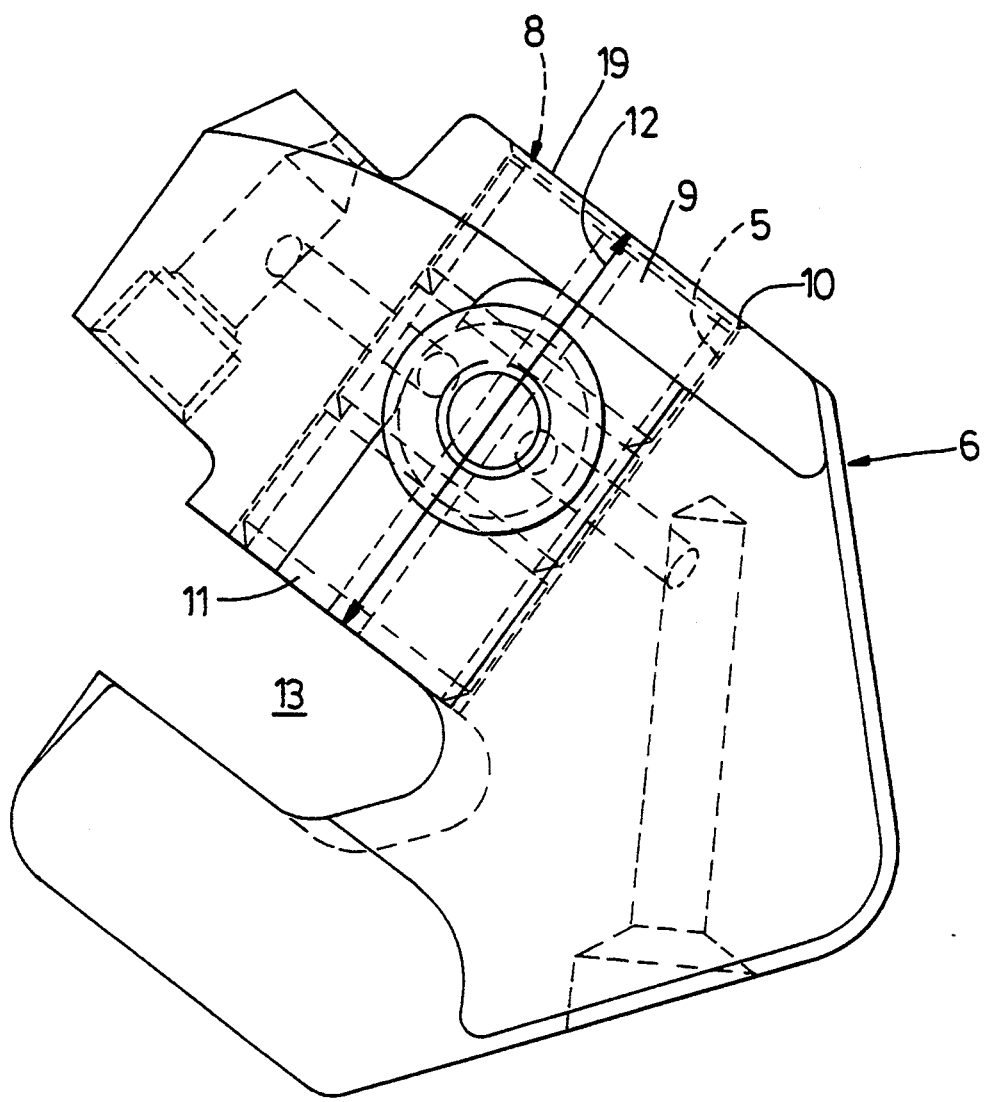
FIG. 3 is a view of a pick box in accordance with the second aspect.

The fit and the springiness of the rings 14A, 14B, 14C is such that they are self-retaining within the bore 5, even when the shank 3 has been pulled from the bore 5, as indicated in FIG. 3, or when the shank 3 has been pushed through the rings 14A, 14B, 14C to attain the position illustrated in FIG. 4, when a seating shoulder 18 on the under side of the head 2 seats on an annular abutment surface 19 of the box 6 and simultaneously an end face 20 of the shank 3 abuts a seating surface 21 of an anvil 22 of the box 6 spaced from the lower end 11 of the bore 5, so that the clearance 13 is defined between the surface 21 of the anvil 22 and the lower end 11 of the bore 5.

The pick 1 and in particular its shank 3 is inserted, by hand, into the box 6 and in particular its bore 5. Consequently, to avoid this operation being unnecessarily difficult in mine conditions, some tolerance is required, but this results in slight play between the pick 1 and the box 6, which play increases in use due to the forces and vibrations involved in mineral cutting, thereby damaging rings 14A and 14C but leaving a relatively unscathed ring 14B.

When it is established that the play is unacceptable, the pick 1 is, in the usual manner, levered out of the box 6—typically by the use of a cold chisel or similar tool. Then, a fresh ring is held over ring 14A, co-incident with the axis 15, and again a simple tool—a hammer, is used to hammer the fresh ring into the bore 5 until the worn ring 14C is pushed out of the bore 5, exiting from the lower end 11 of the bore, and falling away via the clearance 13. The worn ring 14A is then in the central ring (but this is of no consequence), the fresh ring assumes the position of the upper ring, and the unworn ring 14B assumes the position of the lower ring. The pick 1 (or a replacement pick if the carbide insert 4 is too worn) is inserted into the box 6.

Clearly, on the next occasion that wear on the rings demands fresh rings, then three fresh rings must be hammered into the bore 5, and the cycle of one fresh ring followed by three rings is repeated.

Also, indicated in FIG. 4 is a water supply route 23 to a spray nozzle 24 housed in a bore 25 to emit a water spray 26 to a zone 27 at the rear of the head 2, having regard to the direction of rotation of the drum 7.

What is claim is:

1. A liner sleeve adapted, in use, to be interposed between the external periphery of a round shank of a point attack, mineral cutter pick, and the internal periphery of a circular, shank-receiving bore of a pick box, said sleeve being constituted by a plurality of individual rings stacked end-to-end in abutting relationship about a common longitudinal axis, said rings-together having an axial length approximating to the axial length of said bore.

2. A sleeve as claimed in claim 1, wherein said rings are split spring steel rings.

3. A sleeve as claimed in claim 1, constituted by three of said rings, being an upper ring, abutting a middle ring, abutting a lower ring.

4. A pick box having a circular section bore to receive a shank, also a circular section, of a mineral cutter pick, said bore having open upper and lower ends and being lined with a sleeve constituted by a plurality of individual rings stacked end-to-end in abutting relationship about a common longitudinal axis and adapted to engage said bore frictionally so as to be self-retaining therein, and of such internal diameter to engage said shank of said pick as a push-in, prise-out, sliding fit.

5. A pick box as claimed in claim 4, wherein said rings are positionally self-retaining within said bore.

6. A pick box as claimed in claim 4, wherein said rings are friction fit within said bore.

7. A pick box as claimed in claim 4, wherein a frusto-conical mouth is provided at said upper end of said bore to aid insertion of said rings into said bore, in a direction from said Upper end towards said lower end of said bore.

8. A point attack round shank pick in combination with a box, the latter having a circular section, shank-receiving bore having an upper end adjacent a head of said pick and a lower end, with a sleeve interposed between said bore and said shank, said sleeve being constituted by a plurality of individual rings stacked end-to-end in abutting relationship on a common axis co-incident with that of said bore, and with sufficient clearance provided adjacent said lower end of said bore that a lowermost ring of said plurality may exit from said lower end of said bore whereupon a fresh ring is hammered into said upper end of said bore.

9. A pick and box combination as claimed in claim 8, wherein said pick has a carbide tip and also an enlarged head, said head providing, on its underside, an annular seating shoulder to seat on an annular abutment surface of said box.

10. A pick and box combination as claimed in claim 8, wherein said box is additionally provided with an anvil spaced from said lower end of said bore, a seating surface provided on said anvil on which seating surface a lower end of said shank is adapted to seat, to provide an additional seating surface, with said-clearance for exit of hammered-out rings defined between said lower end of said bore and said anvil surface.

* * * * *